United States Patent [19]

Lepor

[11] 4,122,912

[45] Oct. 31, 1978

[54] DRY COOLED JET AIRCRAFT RUNUP NOISE SUPPRESSION SYSTEM

[75] Inventor: Meyer Lepor, San Diego, Calif.

[73] Assignee: The United States of America as represented by the Secretary of the Navy, Washington, D.C.

[21] Appl. No.: 780,571

[22] Filed: Mar. 23, 1977

[51] Int. Cl.² .............................. F01N 1/02; F01N 7/02
[52] U.S. Cl. .................................... 181/218; 181/220
[58] Field of Search .............. 181/210, 213, 217, 218, 181/220, 283, 286, 288, 203

[56] References Cited

U.S. PATENT DOCUMENTS

| | | | |
|---|---|---|---|
| 2,810,449 | 10/1957 | Coleman | 181/218 |
| 2,864,455 | 12/1958 | Hirschorn | 181/217 |
| 2,940,537 | 6/1960 | Smith | 181/218 |
| 3,620,329 | 11/1971 | Wenzlaff | 181/218 |
| 3,709,319 | 1/1973 | Lawyer | 181/218 |

Primary Examiner—Nicholas P. Godici
Attorney, Agent, or Firm—Richard S. Sciascia; Ervin F. Johnston; Thomas Glenn Keough

[57] ABSTRACT

A stationary jet exhaust noise suppressor has an elongate housing containing a longitudinal tunnel. The hot exhaust from a jet engine blows through the tunnel and is deflected upwards at the tunnel's end. A number of resonant chambers are located along the tunnel's length and have resonant frequencies corresponding to objectional frequencies in the jet exhaust noise spectrum. Since there are a number of perforations in the walls of the tunnel, the resonant chambers are put in communication with the jet exhaust noise in the tunnel to attenuate the objectionable frequencies. Since the resonant chambers are formed by rigid stainless steel panels, trouble free, long term noise suppression is assured. A cooling duct is provided in the walls of the housing to draw in ambient air to reduce the possibility of heat damage.

7 Claims, 10 Drawing Figures

SECTIONS I & II

| CHAMBER | A | B | C | D | E | F |
|---|---|---|---|---|---|---|
| % AREA OF 19 | 20 | 14.5 | 14.5 | 14.5 | 16 | 20 |
| CAVITY LENGTH (FT.) | 4.50 | 2.25 | 1.13 | 0.68 | 0.28 | 0.14 |

SECTION III

| CHAMBER | G | H | I | J | K | L |
|---|---|---|---|---|---|---|
| % AREA OF 19 | 25 | 11.3 | 11.3 | 11.3 | 16 | 25 |
| CAVITY LENGTH (FT.) | 4.25 | 2.00 | 1.00 | 0.62 | 0.25 | 0.13 |

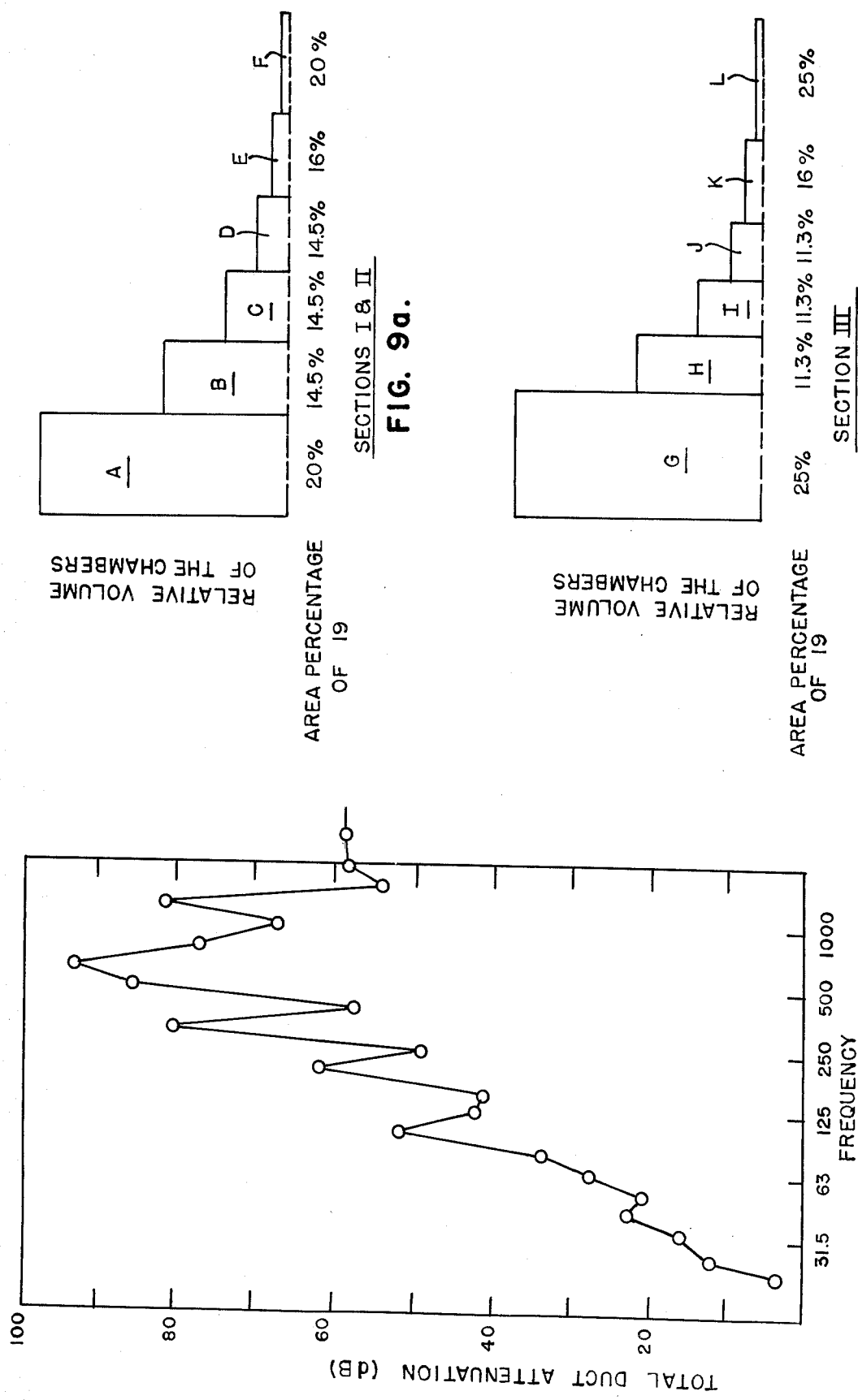

DRY COOLED JET AIRCRAFT RUNUP NOISE SUPPRESSION SYSTEM

Statement of Government Interest

The invention described herein may be manufactured and used by or for the Government of the United States of America for governmental purposes without the payment of any royalties thereon or therefor.

BACKGROUND OF THE INVENTION

A first generation of sound suppressor installations for jet engines, some of which having afterburners, were of the wet-cooling type. While their attenuation capabilities were somewhat acceptable, there were a number of disadvantages. With wet-cooling, the suppressor exhaust includes water vapor, raw fuel and free carbon when the after burner is fired. This was largely because the water spray quenched the flame. The unsightly vapor cloud created was not the biggest problem for it was the objectionable sooty vapor, or pollution, coating everything in the immediate vicinity. In addition, the sooty vapor had a deleterious effect on some types of acoustical materials.

Another suppressor design was sealed around the intake and exhaust of a particular aircraft type. The requirement for acoustic sealing created a requirement for accurate positioning of the aircraft relative to the suppressor. Even with careful positioning, some of the jet noise and inlet noise leaked around the seals between the aircraft and the sound suppressors. Because a large portion of the aircraft was not enclosed, objectionable noise levels were radiated from the airframe itself.

A recent European acoustical enclosure employs an acoustically treated augmentor tube which was sized so that the momentum flux of the aircraft's exhaust jet would pump in enough outside air through the mouth of the tube to cool the exhaust gases to thereby eliminate the need for water spray. Positioning of the aircraft is not difficult; both outside and inside sound levels are acceptable; the enclosures provided a lighted, all-weather, 24 hour-a-day place to work on the aircraft; the installations were designed so as to be adaptable to several aircraft types; and the problems attendant wet-cooling and sealing were avoided. However, inside the augmentor tube a limitation of this design quickly became apparent. The acoustic damping material in the walls of the tube, even though it was covered by a sieve-like plate, was battered apart by the roar of the jet exhaust and lost its noise absorption capability. This was largely due to the fact that the excessive vibration broke down the fibers and packed them together and, after a time, fused them in a mass. Additionally, the hot blast of the jet engines, particularly when on afterburner, melted the sieve-like retaining wall in the tube in an area downstream from the jet exhaust where the jet flow slowed. As a consequence, the tube had to be disassembled periodically and the fibrous sound absorptive material had to be replaced. Aside from the fact that this maintenance was expensive, there was a "down time" during which the enclosure could not be used.

Thus, there is a continuing need in the state-of-the-art for a jet exhaust noise suppressor that effectively attenuates noise and which is relatively maintenance free.

SUMMARY OF THE INVENTION

An improvement for a stationary jet exhaust noise suppressor has an elongate housing defining a longitudinal tunnel for passing jet exhaust. An attenuating means is carried inside the housing in communication with the tunnel to attenuate the jet exhaust noise. The attenuating means is configured to have resonant frequencies which are the same as objectionable frequencies in the jet exhaust noise spectrum. A means introduces ambient air through the walls of the housing to cool the attenuating means so as to prevent heat damage.

It is a prime object of the invention to provide an improved stationary jet exhaust noise suppressor.

Another object is to provide a noise suppressor fabricated from rigid panels.

Yet another object is to provide a number of resonant chambers in a noise suppressor for attenuating jet exhaust noise.

Another object is to provide a noise suppressor having perforated panels communicating with resonant chambers for noise suppression.

Still another object is to provide a noise suppressor which resists heat damage by introducing ambient air.

Yet another object is to provide the noise suppressor which marketedly reduces time consuming maintenance.

Still another object is to provide a noise suppressor employing Helmholtz resonators along its length.

Yet a further object is to provide a noise suppressor having differently shaped resonators along its length for the efficient attenuation of higher and lower frequencies in the jet exhaust noise spectrum.

These and other objects of the invention will become more readily apparent from the ensuing specification when taken together with the drawings.

BRIEF DESCRIPTION OF THE DRAWINGS

FIG. 8 is a graphical representation of the attenuation of the invention.

FIGS. 9a and 9b are graphical representations of the relative volumes of the chambers.

DESCRIPTION OF THE PREFERRED EMBODIMENT

Figure 6:
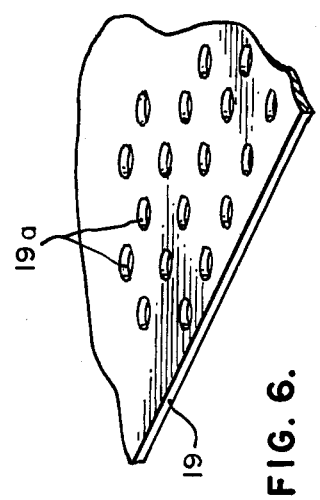
FIG. 6 portrays an area of the perforated panels.
Figure 1:
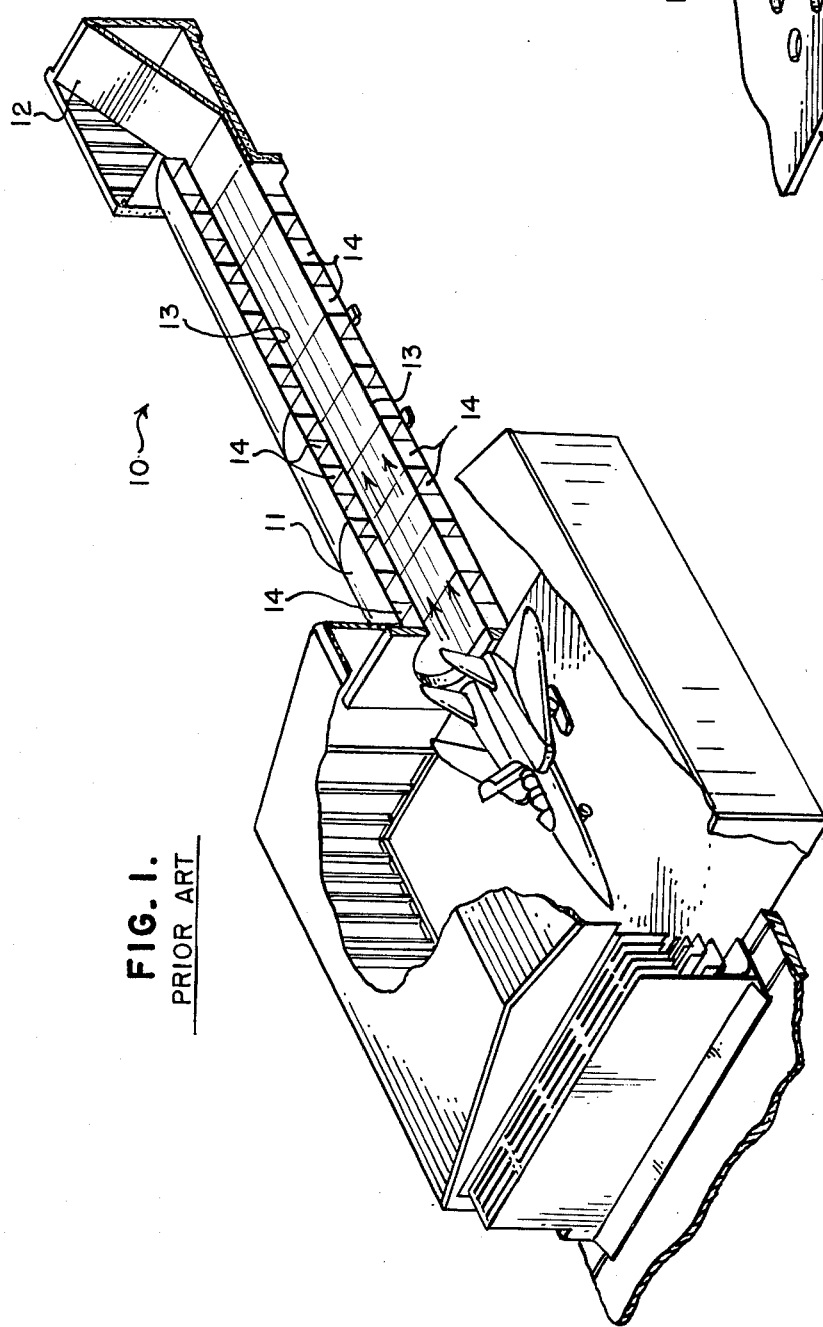
FIG. 1 depicts a prior art suppressor modifiable to include the invention.

Referring now to the drawings, FIG. 1 depicts a representative state-of-the-art stationary jet exhaust noise suppressor 10. A twin jet aircraft 11 is undergoing a stationary test and directs its exhaust through an augment tube 11 and against a baffle 12 which deflects the attenuated blast upwardly. In the conventional suppressor of FIG. 1, a screen-like sheet 13 retains fibrous glass packing, not shown, in a number of compartments 14 along the augmentor tube length.

The main disadvantages of such an arrangement are that the roar of the jet exhaust excessively vibrates the fibrous glass packing. The packing breaks apart and becomes compacted thereby reducing its attenuation effectiveness. In addition, the heat from the jet blast melts and blows away chunks of screen-like sheet 13 irrespective of the fact that cooling air is sucked in at the mouth 15 of the augmentor tube by the jet blast. This cooling air does, in fact insulate the screen-like sheet for a distance down the augmentor tube's length. However, as the jet exhaust flow slows the cooling air is heated sufficiently, damaging temperatures are reached usually in the last one third of the tube's length. These temperatures melt the screen-like sheet and the jet blast blows chunks of it against the baffle.

Figure 2:
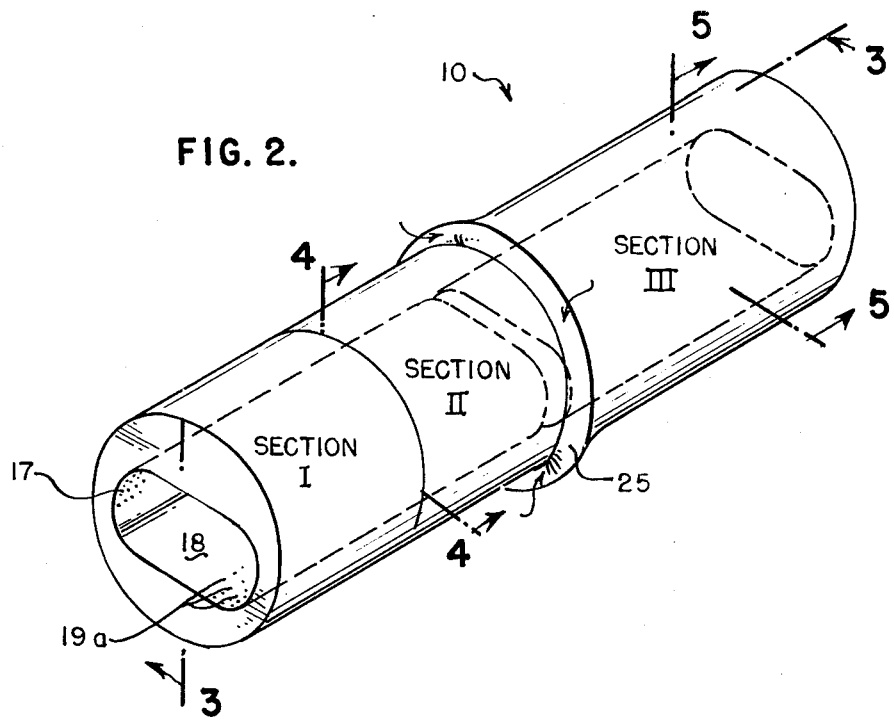
FIG. 2 is an isometric view of the invention.
Figure 3:
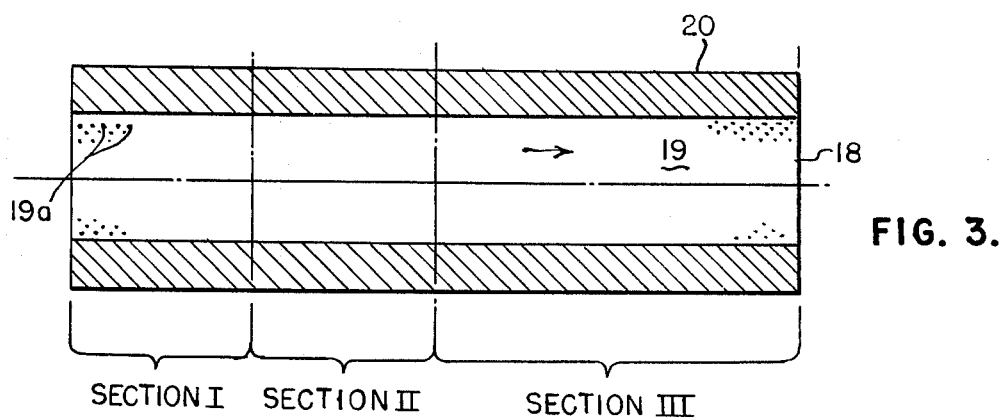
FIG. 3 is a cross-sectional view of the invention taken generally along lines 3—3 in FIG. 2.
Figure 7:
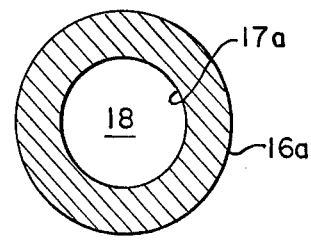
FIG. 7 depicts an end view of a modification of the invention.

With a thought toward overcoming these deficiencies the improvement schematically depicted in FIG. 2, et seq., was designed. The housing 16 of the improvement had an obround mouth 17 from which an obround tunnel extends. The mouth and tunnel are so configured to accommodate twin engine jet aircraft. At this point may it be said that this inventive concept suitably modified could be applicable to a suppressor housing 16a having a round mouth 17a as shown in FIG. 7. It is apparent that the dimensions of elements to be described later would have to be suitably modified for a rounded mouth configuration.

Housing 16 is formed of three adjacent sections, the first two sections make up about one half the length of the housing while the third section takes up the other half. The first and second sections differ from the third sections in that the chambers formed between an inner perforated wall 19 and an outer rigid wall 20 have different dimensions and configurations.

Figure 4:
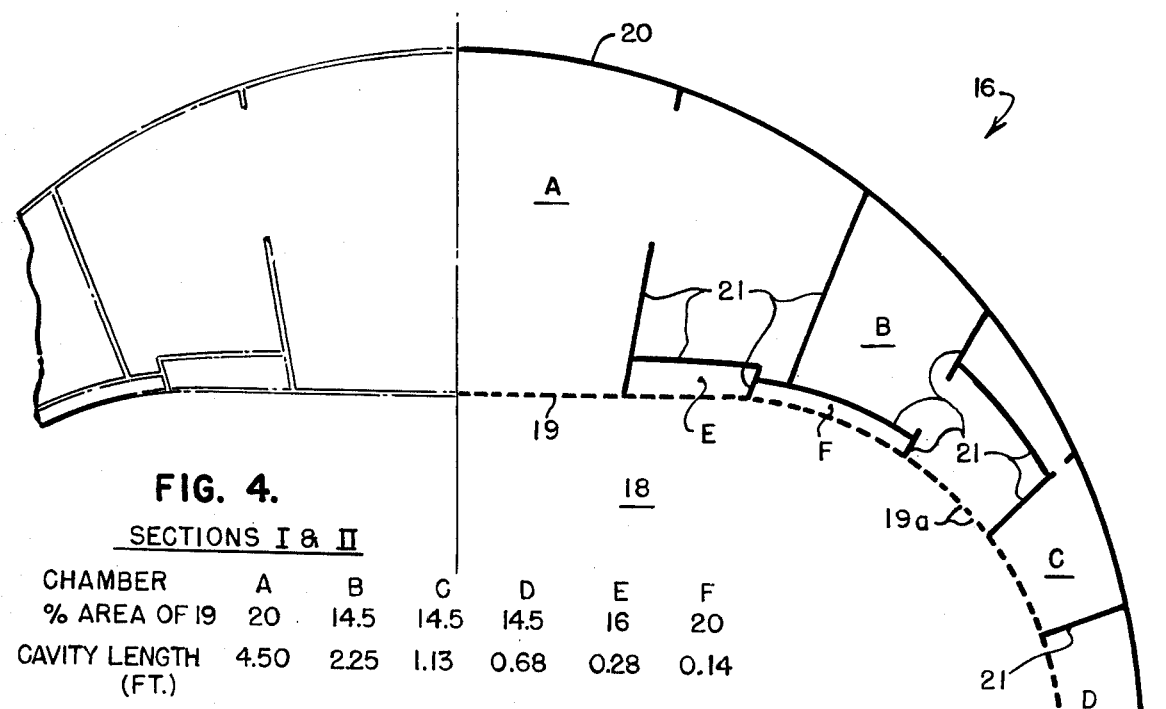
FIG. 4 is a cross representation of the invention taken generally along lines 4—4 in FIG. 2.
Figure 5:
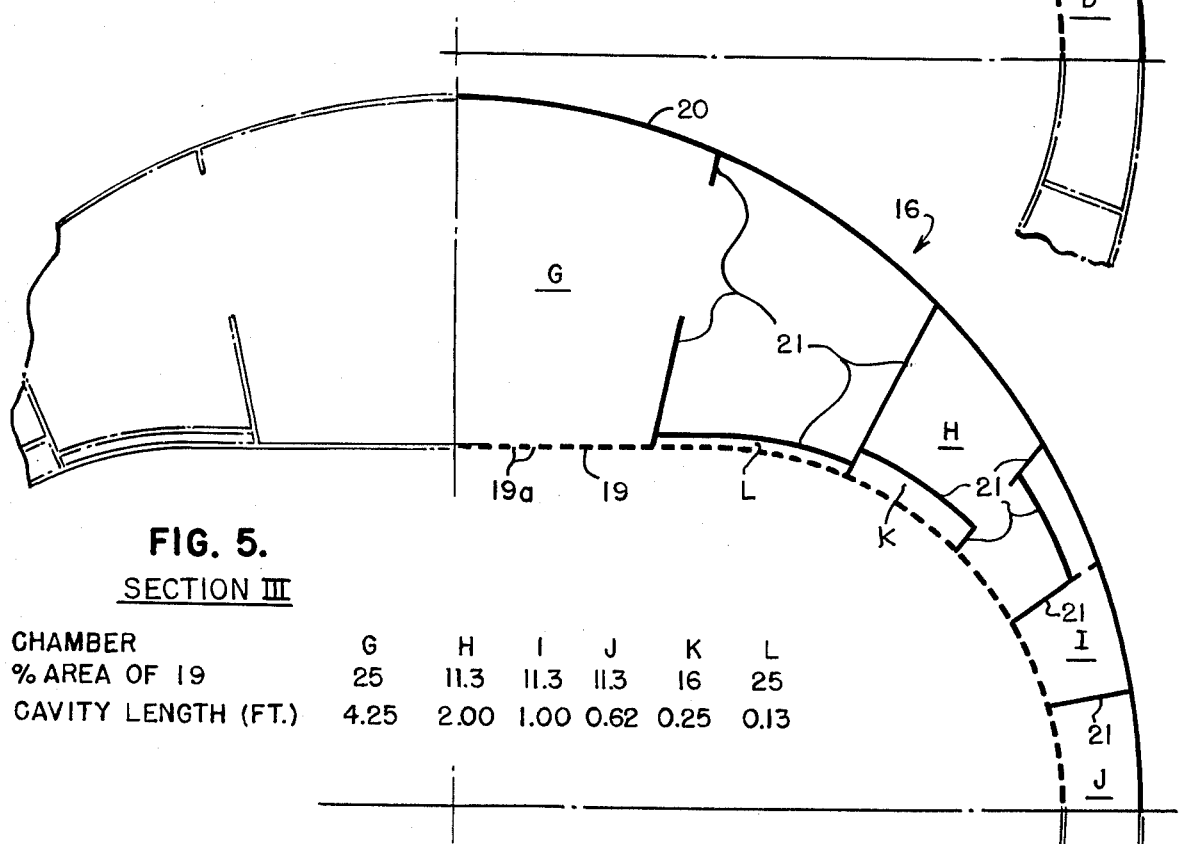
FIG. 5 is a cross-sectional representation of another section of the invention taken generally along lines 5—5 in FIG. 2.

Separater walls 21 are welded between the inner and outer walls in a configuration shown in FIG. 4 to define chambers A through F in sections 1 and 2, see FIG. 4. Similarly, the separater walls are welded in section 3 as shown in FIG. 5 to define resonant chambers J through L. At this point it should be mentioned that FIGS. 4 and 5 show only a quadrature cross-sectional portion of the housing, it being understood that the other three quadrants are similarly configured to achieve a desirable degree of attenuation.

The inner perforated, outer rigid and separater walls are fabricated from thick stainless steel to withstand the excessive vibrations to which the housing will be subjected. The thicker panels also tend to dissipate heat and have a higher tolerance to otherwise damaging temperatures.

The resonant chambers defined by the stainless steel walls can be viewed as being Helmholtz resonators. The particular resonant frequency of each chamber is a function of its depth, volume, length, etc., and the length and diameter of the penetrations communicating with the chambers. The acoustic energy is refracted ninety degrees from the direction of the jet blast down the tunnel. The temperature and velocity gradients displace the acoustic energy into the walls and the chambers attenuate it.

The housing had a length of 90 feet. The perforations 19a in perforated wall 19 had a length of 0.075 inch and 0.075 inch diameters.

An analytical study has verified the noise suppression capabilities of this invention. At a distance of 250 feet away from the suppressor, an 85 dB level over a frequency range of interest was obtained with the suppressor as compared to in excess of a 125 dB level with no suppressor at all, note FIG. 8. The holes of the perforations, in the aggregate, made up 15 percent of the surface area of inner perforated wall 19.

Looking to FIGS. 4 and 9a, sections I and II were configured as shown and dimensioned as noted so that the resonant chambers A, B, C, D, E and F abutted 20, 14.5, 14.5, 14.5, 16 and 20 percent of the surface area of the perforated wall 19, all of these chambers had the 15 percent perforations communicating with tunnel 18. In the first two sections the higher objectional frequencies in the jet exhaust noise spectrum were attenuated. In FIGS. 5 and 9b, section III, the chambers G, H, I, J, K and L are differently dimensioned and configured to have respective surface areas of 25, 11.3, 11.3, 11.3, 16 and 25 percent of the surface area of the inner perforated wall 19. All of these chambers had the 15 perforations communicate with tunnel 18. Section III is located downstream of sections I and II and serves to attenuate the lower objectionable frequencies in the jet exhaust noise spectrum.

The temperature of the jet exhaust is approximately 3,000° Fahrenheit at obround mouth 17 and about 600° Fahrenheit where it is deflected by baffle 12. The jet exhaust flow rate decreases from 2,000 feet per second at the mouth to 400 feet per second at the baffle. This represents significant energy losses attributed to the changes in temperature and velocity which can be expressed as temperature and velocity gradients. It is these gradients which cause the acoustic energy to be deflected toward the perforated walls and into the chambers where the acoustic energy is dissipated. Thus, a much greater insertion loss is obtained than what one would predict from simple silencer theory.

Because there is such a temperature and velocity loss in the jet blast, the perforated wall can get very hot, particularly in the third section where the cooling air entering at mouth 17 has become warm and the hot jet exhaust flow has slowed somewhat. An annular duct 25 draws in additional cool ambient air to protect the perforated wall in section III. The cool air tends to insulate the perforated wall and keep the heat and blast from melting it and blowing it apart.

The length of the tunnel, its diameter, the dimensions and configurations of the chambers, and the number and shapes of the perforations can be changed to suppress different objectionable frequencies in the jet exhaust noise spectrum. More sophisticated metals can be used which can better withstand the vibrations and temperatures. Great flexibility is afforded by this design.

Obviously, many modifications and variations of the present invention are possible in the light of the above teachings, and, it is therefore understood that within the scope of the disclosed inventive concept, the invention may be practiced otherwise than specifically described.

What is claimed is:

1. In a stationary jet exhaust noise suppressor having an elongate housing defining a longitudinal tunnel for passing jet exhaust therethrough, an improvement therefor is provided comprising:

means carried in the housing and communicating with the tunnel for attenuating the jet exhaust noise, the attenuating means is configured to have resonant frequencies which are the same as objectionable frequencies in the jet exhaust noise spectrum, the attenuating means is located outside the lateral dimensions of the longitudinal tunnel and extends the length of the longitudinal tunnel, is formed of more than one section differently configured from one another to have different resonant frequencies corresponding to different objectionable frequencies in the jet exhaust noise spectrum and is formed of a number of rigid panels shaped to define a number of empty resonant chambers, some of the rigid panels are provided with a number of perforations to communicate the resonant chambers with jet exhaust in the tunnel and means formed in the shape of an annular duct and provided two-thirds along the length of the elongate housing for drawing an annular flow of ambient air into the jet exhaust in the tunnel for the last one-third of the length of the elongate housing for insulating the last one-third of the tunnel and for cooling the jet exhaust to prevent damage to the tunnel.

2. An improved noise suppressor according to claim 1 in which two of the sections of the attenuating means are located nearer the source of the jet exhaust to attenuate the higher frequencies in the jet exhaust noise and a single section of the attenuating means is located further away from the source of the jet exhaust to attenuate the lower frequencies in the jet exhaust noise.

3. An improved noise suppressor according to claim 2 in which the drawing means is located between the two sections of the attenuating means and the single section of the attenuating means to assure the cooling of the single section.

4. An improved noise suppressor according to claim 3 in which all of the panels are fabricated from stainless steel plates.

5. An improved noise suppressor according to claim 4 in which the perforations in some of the rigid panels constitute 15 percent of the panels' surface area.

6. An improved noise suppressor according to claim 5 in which the perforated panels are shaped to give the tunnel an obround cross-sectional configuration.

7. An improved noise suppressor according to claim 5 in which the perforated panels are shaped to give the tunnel a round cross-sectional configuration.

* * * * *